(12) United States Patent
Herrity

(10) Patent No.: US 9,015,363 B2
(45) Date of Patent: Apr. 21, 2015

(54) METHOD AND APPARATUS FOR USB SIGNALING VIA INTERMEDIATE TRANSPORTS

(71) Applicant: Omron Network Products, LLC, Pleasanton, CA (US)

(72) Inventor: Kenneth Herrity, Milpitas, CA (US)

(73) Assignee: Omron Management Center of America, Inc., Hoffmann Estates, IL (US)

( * ) Notice: Subject to any disclaimer, the term of this patent is extended or adjusted under 35 U.S.C. 154(b) by 115 days.

(21) Appl. No.: 13/933,679

(22) Filed: Jul. 2, 2013

(65) Prior Publication Data

US 2014/0013013 A1    Jan. 9, 2014

Related U.S. Application Data

(60) Provisional application No. 61/668,310, filed on Jul. 5, 2012.

(51) Int. Cl.
| | |
|---|---|
| G06F 3/00 | (2006.01) |
| G06F 11/30 | (2006.01) |
| G06F 13/40 | (2006.01) |
| G06F 13/42 | (2006.01) |

(52) U.S. Cl.
CPC ........ *G06F 11/3051* (2013.01); *G06F 13/4045* (2013.01); *G06F 2213/0042* (2013.01)

(58) Field of Classification Search
USPC .......................................................... 710/18
See application file for complete search history.

(56) References Cited

U.S. PATENT DOCUMENTS

| | | | |
|---|---|---|---|
| 6,381,666 B1 | 4/2002 | Kejser et al. | |
| 6,389,029 B1 | 5/2002 | McAlear | |
| 6,584,519 B1 | 6/2003 | Russell | |
| 6,603,744 B2 | 8/2003 | Mizutani et al. | |

FOREIGN PATENT DOCUMENTS

| | | |
|---|---|---|
| WO | 02088975 A1 | 11/2002 |
| WO | 2007067191 A2 | 6/2007 |

*Primary Examiner* — Henry Tsai
*Assistant Examiner* — Dean Phan
(74) *Attorney, Agent, or Firm* — Murphy, Bilak & Homiler, PLLC

(57) ABSTRACT

According to one aspect of the teachings herein, a system includes first and second modules that respectively anchor host-side and device-side ends of an intermediate transport link that interconnects a USB host to a USB device. The system detects when the host activates an isochronous endpoint in the device for an isochronous IN data transaction, and the second module autonomously generates data requests for the device and forwards the isochronous data output from the device towards the first module. In turn, the first module buffers the data and provides it to the host in response to host's data requests. However, the first module blocks host requests from propagating to the device and it NACKs host requests until forwarded data is available from the second module. Such operation remains transparent to the host and device, while avoiding USB timing violations, even for extended intermediate transport links.

9 Claims, 2 Drawing Sheets

METHOD AND APPARATUS FOR USB SIGNALING VIA INTERMEDIATE TRANSPORTS

RELATED APPLICATIONS

This application claims priority under 35 U.S.C. §119(e) from the U.S. provisional patent application filed on 5 Jul. 2012 and identified by Application No. 61/668,310, which application is incorporated herein by reference.

TECHNICAL FIELD

The present invention generally relates to Universal Serial Bus (USB) signaling, and particularly relates to the use of an intermediate transport for USB signaling.

BACKGROUND

A wide variety of devices and systems communicate via serial communications carried out over communication links compliant with the Universal Serial Bus or USB specifications. The specifications are promulgated by USB Implementers Forum Inc. (USB-IF), which operates as non-profit organization founded by the companies that developed the USB standard. USB connections are ubiquitous, linking PCs to keyboards, joysticks, cameras, smart phones, and a virtually endless variety of other peripherals.

Three definitional areas describe a USB system, including the USB interconnect, the USB host, and one or more USB devices. The USB is a polled bus and there is only one USB host per USB system. The USB host initiates all transactions and there are four transaction types defined: control, interrupt, bulk, and isochronous. Isochronous data is a data stream whose timing is implied by its delivery rate and in the USB context an isochronous device is an entity with isochronous endpoints, as defined in the USB specification.

An isochronous endpoint sources or sinks sampled analog streams or synchronous data streams. In particular, an endpoint that is capable of consuming an isochronous data stream sent from the host is referred to as an "isochronous sink," while an endpoint that is capable of producing and sending an isochronous data stream to the host is referred to as an "isochronous source." Isochronous transfers are used when working with isochronous data, and such transfers provide periodic, continuous communication between the host and a targeted device. In the USB parlance, a "device" is a logical or physical entity that performs a function. While the term may refer to a single hardware component, it may also refer more broadly to an overall collection of hardware components that perform a particular function. This functional view may be abstracted to the level of the USB-attached entity in question, e.g., a camera function, a gaming controller function, etc. As used herein, the term USB device will be generally understood to be an entity that includes a USB endpoint.

While USB provides a standardized, robust means of inter-device communications, it is not without certain limitations on its flexibility. For example, the older USB 2.0 specification dictates a maximum physical cable length of five meters, and an outer-limit on the overall or end-to-end transaction delays over a hub-extended set of USB links. The more recent USB 3.0 specification does not define a maximum cable length explicitly, although such limits are implicit in its electrical and timing specifications. Such limitations are particularly challenging to address in environments where it would be desirable to have extended isochronous data links used with USB endpoints.

SUMMARY

According to one aspect of the teachings herein, a system includes first and second modules that respectively anchor host-side and device-side ends of an intermediate transport link that interconnects a USB host to a USB device. The system detects when the host activates an isochronous endpoint in the device for an isochronous IN data transaction, and the second module autonomously generates data requests for the device and forwards the isochronous data output from the device towards the first module. In turn, the first module buffers the data and provides it to the host in response to host's data requests. However, the first module blocks host requests from propagating to the device and it NACKs host requests until forwarded data is available from the second module. Such operation remains transparent to the host and device, while avoiding USB timing violations, even for extended intermediate transport links.

An example method of USB signaling control thus includes monitoring USB signals going between a USB host and a USB device that are interconnected via an intermediate transport link anchored on a host-side by a first module having a first local USB link to the USB host and anchored on a device-side by a second module having a second local USB link to the USB device. Here, the first and second modules provide signal conversion functions for transporting the USB signals on the intermediate transport link and the second module performs the monitoring.

The method further includes detecting, at the second module based on its monitoring, when the USB host activates an isochronous endpoint in the USB device for isochronous data IN transactions in which isochronous data will be sent from the isochronous endpoint to the USB host. Still further, the method includes, in response to the detection, the second module autonomously generating data requests for isochronous data from the isochronous endpoint and forwarding isochronous data received from the isochronous endpoint in response to the data requests, to the first module. Correspondingly, the method continues with the first module buffering the isochronous data as forwarded from the second module, and providing it to the USB host in response to receiving data requests generated by the USB host for the IN transactions. Advantageously, however, the first module does not forward such data requests from the USB host to the second module.

In another example embodiment, a system is configured for USB signaling control. The contemplated system comprises a first module having a first local USB link to a USB host and a second module having a second local USB link to a USB device. The first and second modules each has an interface for communicating with the other over an intermediate transport link interconnecting the first and second modules, and they are configured to provide signal conversion functions for transporting USB signals flowing between the USB host and device over the intermediate transport link.

Further, the first module and/or the second module is configured to monitor the USB signals to detect when the USB host activates an isochronous endpoint in the USB device for isochronous data IN transactions, in which isochronous data will be sent from the isochronous endpoint to the USB host. In response to such detection, the second module is configured to autonomously generate data requests for isochronous data from the isochronous endpoint and forward isochronous data received from the isochronous endpoint in response to the data requests, to the first module. Correspondingly, the first module is configured to buffer the isochronous data as forwarded from the second module, and provide it to the USB host in response to receiving data requests generated by the USB host for said IN transactions, while not forwarding such data requests from the USB host to the second module.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
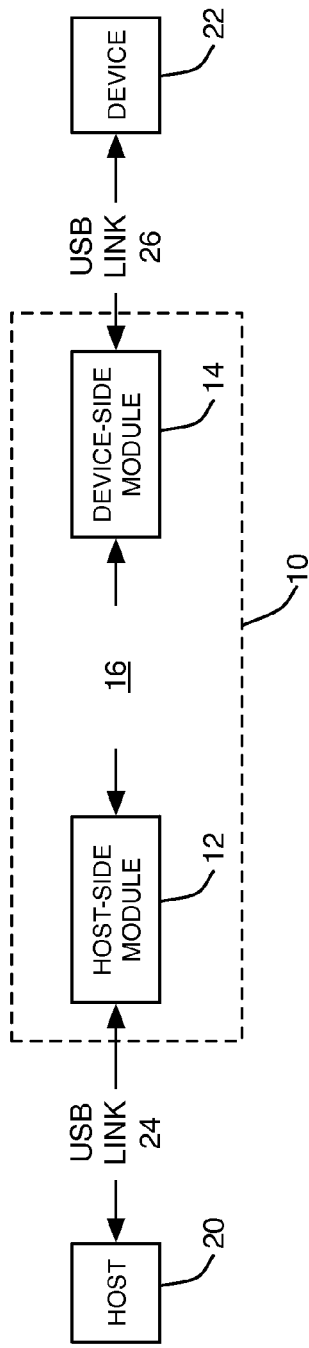
FIG. 1 is a block diagram of one embodiment of a system for extending USB signaling between a USB host and a USB device over an intermediate transport link.

FIG. 1 illustrates one embodiment of a "system" 10 that includes a first module 12 and a second module 14, where the first module 12 operates on a "host side" of an intermediate transport link 16 coupling it to the second module 14, which is regarded as being on a "device side" of the intermediate transport link 16. Here, the "host-side" and "device-side" labels denote that the system 10 connects a USB host 20 to a USB device 22, such that USB signaling flowing between them is conveyed on the intermediate transport link 16.

In more detail, the first module 12 has a first local USB link 24 with the USB host 20, and the second module 14 has a second local USB link 26 with the USB device 22. Conventional USB signals from the USB host 20 are converted in the first module 12 for transport over the intermediate transport link 16, and then reconverted into conventional USB signals by the second module 14 for input to the USB device 22 via the USB link 26. In the opposite direction, conventional USB signals from the device 22 are converted in the second module 14 for transport over the intermediate transport link 16, and then reconverted into conventional USB signals by the first module 12 for input to the USB host 20 via the USB link 24.

In an example embodiment, the intermediate transport link 16 is a fiber optic link and the system 10 offers a number of advantages, such as the ability to extend the USB signaling between the USB host 20 and the USB device 22 over distances much greater than the 5 meter distance stipulated by the USB standard. As a further advantage, the USB signaling may be carried on an optic fiber in conjunction with additional signaling, such as audio/video signaling (HDMI, DVI, etc.).

Indeed, the first and second modules 12 and 14 may be configured as electro-optic transceivers that convert electrical signals received on one or more electrical interfaces into corresponding optical signals for transport over the intermediate transport link 16, and similarly convert optical signals received over the intermediate transport link 16 into corresponding electrical signals output via said one or more electrical interfaces.

In this regard, the first and second modules 12 and 14 may be configured to use Coarse Wavelength Division Multiplexing (CWDM), so that the USB signaling and any other signaling transported by them is carried over a single optical fiber acting as the intermediate transport link 16. In an example configuration, the first and second modules 12 and 14 comprise a complementary pair of "SX51" optical transceiver modules that convert electrical USB signals into corresponding optical signals and back again. Here, "SX51" is a model designation for a family of optical transceiver modules offered by Omron Network Products, LLC, which has a principal place of business at 5700 Stoneridge Dr., Suite 200, Pleasanton, Calif. 94588.

Figure 2:
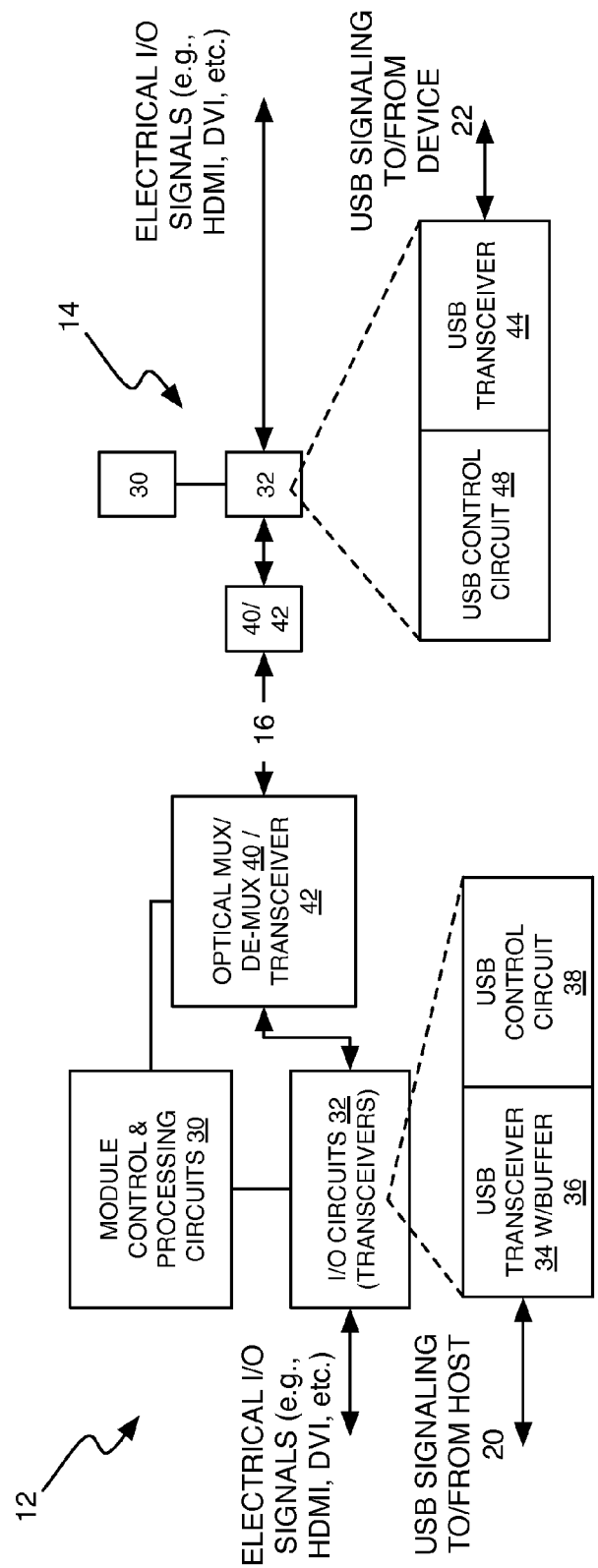
FIG. 2 is a block diagram of example embodiments of first and second modules operating at respective host-side and device-side ends of an intermediate transport link used to carry USB signaling between a USB host and a USB device.

FIG. 2 illustrates example functional circuit details for the first and second modules 12 and 14. The first module 12 comprises module control and processing circuits 30, e.g., one or more microprocessors, DSPs, ASICs, FPGAs, or other digital processing circuitry, which may be configured according to the execution of computer program instructions stored in a memory or other computer-readable medium in or accessible to the first module 12. Further included are input/output (I/O) circuits 32, which may include HDMI/DVI or other multimedia interfaces, and which includes a USB transceiver 34 with a buffer 36 (for buffering USB data from the USB device 22, for use in operational steps that allow the system 10 to extend USB signaling distances far in excess of the 5 meter limitation imposed by the USB standard).

In this regard, one sees a USB control circuit 38 implemented as part of I/O circuits 32. Alternatively, the USB control circuit 38 is integrated as part of the module control and processing circuits 30. In either case, the USB control circuit 38 allows extended-distance USB signaling without causing USB timing violations at the USB host 20 by taking advantage of the conventional USB "retry" or "retransmission" behavior. For example, in a conventional IN transaction with a direct USB connection between the USB host 20 and the USB device 22, the USB host 20 issues an IN token to the USB device 22. If the USB device 22 is ready, it responds to the IN token by returning a data packet within the maximum response time allowed by the USB standard for a single USB transaction. However, if the USB device 22 is not ready, it issues a NACK, which causes the USB host 20 to retry the request. If the USB device 22 is ready when the request is retried, it responds; otherwise, it NACKs again, which prompts the USB host 20 to retry the request a second time. Further retries are permitted, and the process may repeat until the USB device 22 responds with the requested data, or the transaction is otherwise terminated.

The system 10 takes advantage of this retry behavior to extend USB signaling distances. For example, when the USB host 20 requests an asynchronous data packet from the USB device 22, it sends an IN token that is received by the first module 12. The first module 12 returns a NACK to the USB host 20 within the maximum response time and meanwhile forwards the IN token to the second module 14, where it is delivered to the USB device 22. In response, the USB device 22 outputs an asynchronous data packet that is received by the second module 14 and ACKed by the second module 14 within the maximum response time limit. The second module 14 forwards the data packet to the first module 12, which receives and buffers the data packet, meaning that the buffered data will be available for immediate delivery to the USB host 20 from the buffer 36 of the first module 12, when the USB host 20 retries the data request by issuing a subsequent IN token targeting the same USB device ID/endpoint.

Broadly, then, for the above context, the system 10 avoids violation of the maximum USB response time limits by responding to the initial data request from the USB host 20 with a NACK, while also forwarding that request toward the targeted USB endpoint—i.e., a USB device 22 that is attached directly to the USB interface of the second module 14, or attached to it through a USB hub. Assuming no faults or other errors, that forwarding ultimately results in the requested data being sent back from the USB device 22 to the first module 12, where it is buffered for delivery to the USB host 20 when it retries the request. To the extent that the USB host 20 retries the request one or more times before the requested data is buffered and available in the first module 12, the first module 12 will continue to respond with NACKs, where each NACK is provided within the permitted maximum response time.

FIG. 2 further illustrates that the first module 12 includes an optical mux/de-mux 40 and optical transceiver 42, for optical signaling over the intermediate transport link 16. The second module 14 includes similar circuitry, with certain aspects of such circuitry configured to perform processing specific to the device-side of the intermediate transport link 16. In that regard, among the various illustrated circuitry, one sees that the second module 14 also includes I/O circuits 32, including a USB transceiver 44 for communicating with the USB device 22, and further includes a USB control circuit 48.

In one or more embodiments, the USB control circuit 48 of the second module 14 is configured to perform advantageous control and processing in the context of isochronous data transactions conducted between the USB host 20 and the USB device 22. Broadly, the USB control circuit 48 is configured to "snoop" or otherwise monitor USB signaling going between the USB host 20 and USB device 22, to detect control signaling associated with the USB host 20 configuring and activating an isochronous endpoint in the USB device 22, for an isochronous data transfer from the USB device 22 to the USB host 20. For example, the USB control circuit 48 detects certain Standard Device Requests, such as GET_INTERFACE, SET_INTERFACE, GET_CONFIGURATION, and SET_CONFIGURATION, such as are defined in Chapter 9.4 of the USB Specification, Rev. 1.1.

In such an event, the USB control circuit 48 acts as a surrogate or substitute USB host, by autonomously generating the appropriate number of isochronous data requests and sending those requests to the USB device 22 at the proper timing. Further, under control of the USB control circuit 48, the second module 14 receives isochronous data from the USB device 22 in correspondence with its periodically generated isochronous data requests and forwards the data to the first module 12. The first module 12 buffers such incoming data as it is received, and provides it to the USB host 20 in response to receiving the isochronous data requests generated by the USB host 20 for ongoing isochronous data transaction. Notably, because the second module 14 generates like requests autonomously, there is no need to send the host's requests over the intermediate transport link 16, and the first module 12 therefore does not send the host's requests to the second module 14.

Figure 3:
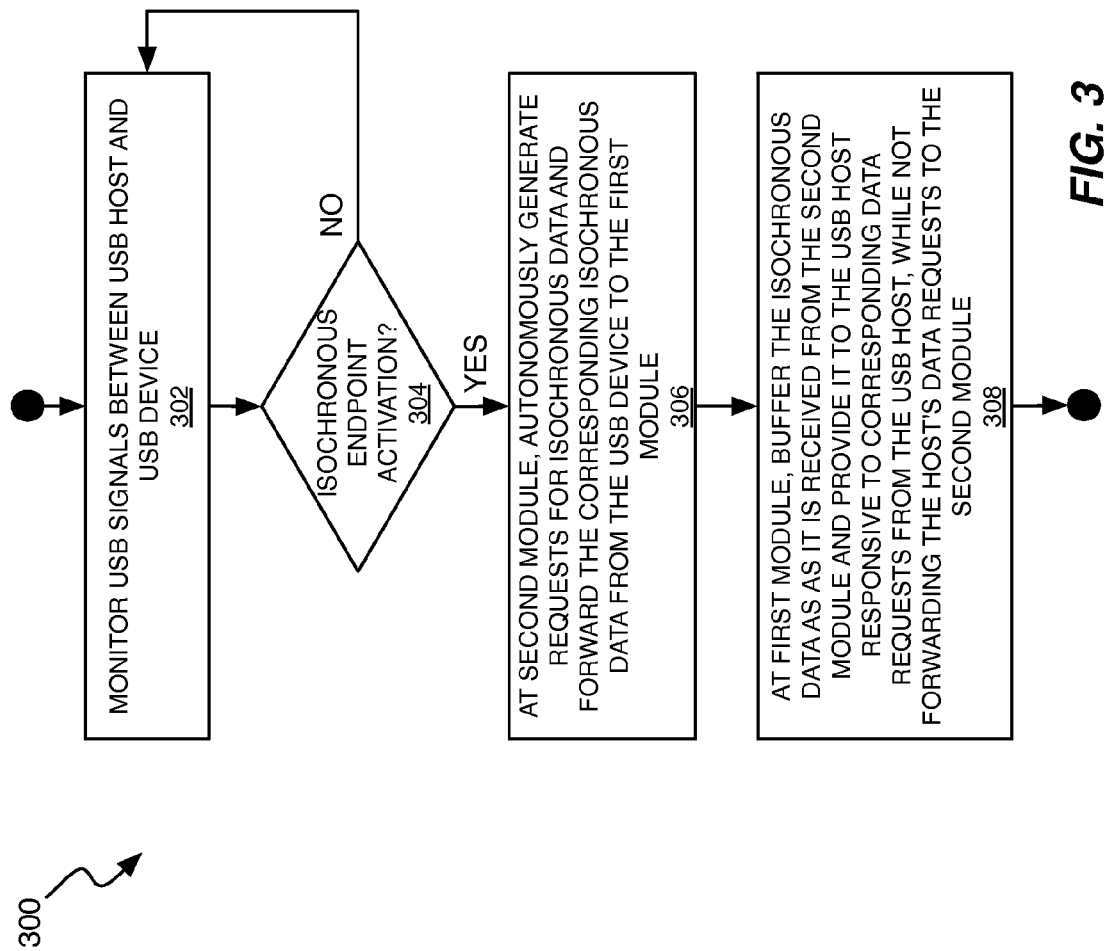
FIG. 3 is a logic flow diagram of one embodiment of a method of processing, for improved handling of isochronous data transfers from a USB device to a USB host using a system such as shown in FIG. 1.

FIG. 3 illustrates an example method 300 corresponding to the above processing. It will be appreciated that one or more steps in the illustrated method may be performed in a different order, or may be performed in parallel. Further, it will be understood that the system 10 may implement the illustrated method based on the first module 12 executing computer program instructions stored at the first module 12, and the second module 14 executing computer program instructions stored at the second module 14.

With the above in mind, the logic flow diagram in FIG. 3 can be understood as a method 300 of USB signaling control that includes (Block 302) monitoring USB signals going between a USB host 20 and a USB device 22 that are interconnected via an intermediate transport link 16 anchored on a host-side by a first module 12 having a first local USB link 24 to the USB host 20 and anchored on a device-side by a second module 14 having a second local USB link 26 to the USB device 22. The first and second modules 12 and 14 provide signal conversion functions for transporting the USB signals on the intermediate transport link 16, and the monitoring at issue here is performed by the second module 14 on the device-side of the intermediate transport link 16.

The method 300 further includes detecting (Block 304) when the USB host 20 activates an isochronous endpoint in the USB device 22, for an IN transaction. This detecting is performed at the second module 14, based on the above-described monitoring of USB signaling. In response to such detection (YES from Block 304), the second module 14 autonomously generates data requests for the IN transaction and forwards isochronous data received from the USB device 22 in response to the data requests, to the first module 12 (Block 306).

Correspondingly, the first module 12 buffers the isochronous data as forwarded from the second module 14, and provides it to the USB host 20 in response to receiving data requests generated by the USB host 20 for the IN transaction, while not forwarding such data requests from the USB host to the second module (Block 308). This approach provides for the regularly timed delivery of isochronous data from the USB device 22 to the USB host 20, without requiring the host's repeated, timed data requests from having to be transported over the intermediate transport link 16.

Such advantageous operations are based on the second module 12 intelligently acting as a surrogate or substitute USB host for the isochronous data transfer, from the perspective of the USB device 22. This intelligent behavior in turn is enabled by the second module's monitoring of USB signaling for isochronous endpoint activations and determining the corresponding transaction parameters from the configuration information signaled in such activations.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of Universal Serial Bus (USB) signaling control comprising:
   monitoring USB signals going between a USB host and a USB device that are interconnected via an intermediate transport link anchored on a host-side by a first module having a first local USB link to the USB host and anchored on a device-side by a second module having a second local USB link to the USB device, wherein the first and second modules provide signal conversion functions for transporting the USB signals on the intermediate transport link and said monitoring is performed by said second module;
   detecting, at said second module based on said monitoring, when the USB host activates an isochronous endpoint in the USB device for isochronous data IN transactions in which isochronous data will be sent from the isochronous endpoint to the USB host, and, in response to said detecting:
       at said second module, autonomously generating data requests for isochronous data from the isochronous endpoint and forwarding isochronous data received from the isochronous endpoint in response to the data requests, to the first module; and at said first module, buffering the isochronous data as forwarded from the second module, and providing it to the USB host in response to receiving data requests generated by the USB host for said IN transactions, while not forwarding such data requests from the USB host to the second module.

2. The method of claim 1, further comprising managing an aggregate buffer capacity so that isochronous data from more than one USB endpoint may be buffered at the same time, including limiting a maximum amount of the aggregate buffer capacity that can be consumed by isochronous data from any one of the multiple USB devices to less than the aggregate buffer capacity.

3. The method of claim 1, wherein multiple isochronous endpoints may be active concurrently in one or more USB devices connected to the second module, and wherein the isochronous data buffered for any given such endpoint is limited to a single data packet and new incoming data packets from that same endpoint replaces any previously buffered data packet already in the buffer for that endpoint.

4. The method of claim 1, wherein said monitoring is performed on the first local USB link between the first module and the host, or on the second local USB link between the second module and the USB device.

5. The method of claim 1, wherein said monitoring includes monitoring Standard Device Requests as defined in the USB standards, to identify isochronous endpoints, and further wherein said detecting comprises detecting USB SET_CONFIGURATION or GET_CONFIGURATION transactions and/or SET_INTERFACE or GET_INTERFACE transactions, to determine when such isochronous endpoint are started.

6. The method of claim 1, further comprising detecting when the isochronous endpoint is no longer active, based on monitoring further USB signaling involving the isochronous endpoint.

7. The method of claim 1, further comprising terminating the autonomous isochronous data transactions with the isochronous endpoint responsive to detecting that the isochronous endpoint has powered-down, become disabled, or been disconnected.

8. The method of claim 1, wherein the autonomous transactions are generated such that each identified isochronous endpoint gets a single autonomous transaction per USB frame.

9. A system configured for Universal Serial Bus (USB) signaling control comprising:

a first module having a first local USB link to a USB host and a second module having a second local USB link to a USB device, each of said first and second modules having an interface for communicating with each other over an intermediate transport link interconnecting the first and second modules, and wherein the first and second modules are configured to provide signal conversion functions for transporting USB signals flowing between the USB host and device over the intermediate transport link; and wherein at least one of said first and second modules is configured to monitor said USB signals, to detect when the USB host activates an isochronous endpoint in the USB device for isochronous data IN transactions in which isochronous data will be sent from the isochronous endpoint to the USB host;

wherein, in response to said detecting, said second module is configured to autonomously generate data requests for isochronous data from the isochronous endpoint and forward isochronous data received from the isochronous endpoint in response to the data requests, to the first module; and wherein said first module is configured to buffer the isochronous data as forwarded from the second module, and provide it to the USB host in response to receiving data requests generated by the USB host for said IN transactions, while not forwarding such data requests from the USB host to the second module.

* * * * *